(12) United States Patent
Kettavong et al.

(10) Patent No.: US 11,160,411 B2
(45) Date of Patent: Nov. 2, 2021

(54) AUXILIARY PROCESSING DEVICE FOR APPLIANCE

(71) Applicant: Vita-Mix Management Corporation, Olmsted Township, OH (US)

(72) Inventors: Phonesacksith Guy Kettavong, Medina, OH (US); Jack W. Gee, II, Willoughby, OH (US); Stephen P. Rukavina, Rocky River, OH (US); Stephen Hosey, North Olmsted, OH (US); Richard D. Boozer, Wakeman, OH (US); Corey Walker, Olmsted Falls, OH (US)

(73) Assignee: Vita-Mix Management Corporation, Olmsted Township, OH (US)

( * ) Notice: Subject to any disclaimer, the term of this patent is extended or adjusted under 35 U.S.C. 154(b) by 184 days.

(21) Appl. No.: 16/166,525

(22) Filed: Oct. 22, 2018

(65) Prior Publication Data

US 2019/0117005 A1 Apr. 25, 2019

Related U.S. Application Data

(60) Provisional application No. 62/575,080, filed on Oct. 20, 2017.

(51) Int. Cl.
| | |
|---|---|
| *A47J 43/04* | (2006.01) |
| *A47J 27/12* | (2006.01) |
| *A47J 19/00* | (2006.01) |
| *A47J 27/00* | (2006.01) |
| *A47J 27/04* | (2006.01) |
| *A47J 43/06* | (2006.01) |
| *A47J 43/07* | (2006.01) |
| *A47J 36/16* | (2006.01) |
| *A47J 43/046* | (2006.01) |
| *A23N 1/02* | (2006.01) |

(52) U.S. Cl.
CPC ............. *A47J 27/12* (2013.01); *A23N 1/02* (2013.01); *A47J 19/005* (2013.01); *A47J 27/002* (2013.01); *A47J 27/04* (2013.01); *A47J 36/16* (2013.01); *A47J 43/046* (2013.01); *A47J 43/06* (2013.01); *A47J 43/0722* (2013.01); *A47J 2027/043* (2013.01); *A47J 2201/00* (2013.01)

(58) Field of Classification Search
CPC ............ A47J 43/04; A47J 43/046; A23N 1/02
USPC ..................................... 99/510, 513
See application file for complete search history.

(56) References Cited

U.S. PATENT DOCUMENTS

| 4,226,175 A * | 10/1980 | Sandor .................... A47J 31/42 99/286 |
| 5,273,358 A | 12/1993 | Byrne |
| D666,056 S | 8/2012 | Boozer |

(Continued)

FOREIGN PATENT DOCUMENTS

EP 2594175 A1 * 5/2013 .......... A47J 37/1295

*Primary Examiner* — Reginald Alexander
(74) *Attorney, Agent, or Firm* — McDonald Hopkins LLC

(57) ABSTRACT

A blender system includes a base and a steamer basket. The basket is inserted into a container. The container has interior pillars. The basket contacts and rests on the pillars. The pillars keep the basket above blades disposed in the container. The basket receives foodstuff. The base includes a motor and a housing. The container is attached to the housing. The motor drives the blades to interact with contents within the container.

15 Claims, 15 Drawing Sheets

(56) References Cited

U.S. PATENT DOCUMENTS

| | | | |
|---|---|---|---|
| 2012/0073450 A1* | 3/2012 | Constans | A47J 27/04 |
| | | | 99/339 |
| 2014/0216277 A1* | 8/2014 | Chen | A47J 19/027 |
| | | | 99/513 |
| 2014/0251162 A1* | 9/2014 | Zhou | A47J 27/04 |
| | | | 99/403 |
| 2014/0272059 A1* | 9/2014 | Krebs | A23L 5/13 |
| | | | 426/510 |
| 2014/0286120 A1 | 9/2014 | Kolar | |
| 2016/0012987 A1* | 1/2016 | Deshayes | H01H 13/70 |
| | | | 200/5 A |
| 2016/0256004 A1* | 9/2016 | Kolar | G06K 7/10297 |
| 2018/0110373 A1* | 4/2018 | Zhang | A47J 43/0722 |
| 2018/0353918 A1 | 12/2018 | Boozer | |
| 2019/0000274 A1* | 1/2019 | Frielinghaus | A47J 27/13 |
| 2019/0075971 A1* | 3/2019 | Noca | A47J 36/16 |

* cited by examiner

AUXILIARY PROCESSING DEVICE FOR APPLIANCE

CROSS-REFERENCE TO RELATED APPLICATION

This application claims priority to U.S. Provisional Patent Application No. 62/575,080 entitled "AUXILIARY PROCESSING DEVICE FOR APPLIANCE," filed on Oct. 20, 2017, which is incorporated herein by reference in its entirety.

TECHNICAL FIELD

The present teachings relate to a blending system for steaming foodstuff, and more particularly, to an auxiliary processing device for a blending appliance.

BACKGROUND

Blender systems are often used to blend and process foodstuffs. Conventional blenders generally include a base with a motor, and a mixing container with an operable mixing blade disposed therein. Blenders often include a fan that is driven by a motor. The motor additionally drives a blade disposed within a container. An example of such a system is described in U.S. Pat. No. 5,273,358 A.

These blender systems are often used to blend and process foodstuffs. Frozen, frosty, or icy drinks have become increasingly popular. Such drinks include the traditional shakes, and the more recently popular smoothies. Shakes, or milkshakes, are typically formed of ice-cream and/or milk, and flavored as desired, with or without additives, such as candies, chocolates, peanut butter, fruits, etc. Milkshakes typically are available at most fast-food restaurants, such as burger chains, and may be made by special machines, or hand-made using mixers. Smoothies tend to be healthier, and are formed of ice, frozen yogurt, and/or sorbet, and also may include additives such as fruits, fruit juice, vitamins, supplements, etc. Smoothies typically are available from specialty chains or juice bars, and may be made with commercial or restaurant-grade blenders. Such drinks also may be made at home, using a standard personal blender. Blenders can also be used to create hot foodstuff such as soups and hot beverages.

One disadvantage with making such drinks, or utilizing blenders, is the difficulty in operating the blender due to the specific ingredients required in some recipes. Moreover, these traditional blenders have limited uses. As such, users may need to buy other appliances or specialized products. For example, users may need to buy coffee makers, tea pots, steamer baskets, or other products to make specific drinks or food.

The present disclosure contemplates using an appliance to generate steam for steaming, cooking, infusing, cleaning, or preparing foodstuff that is in a basket, but does not expose the foodstuff in the basket to the rotating element of the appliance, such as a blade or whipping disk. Moreover, the present disclosure also contemplates a basket filter system that utilizes an appliance to generate movement of a liquid/fluid to steep, infiltrate, and produce coffee and teas by submerging the basket completely to infuse the liquid with a tea, coffee, or the like.

DESCRIPTION OF THE DRAWINGS

The present teachings may be better understood by reference to the following detailed description taken in connection with the following illustrations, wherein.

DETAILED DESCRIPTION

Figure 1:
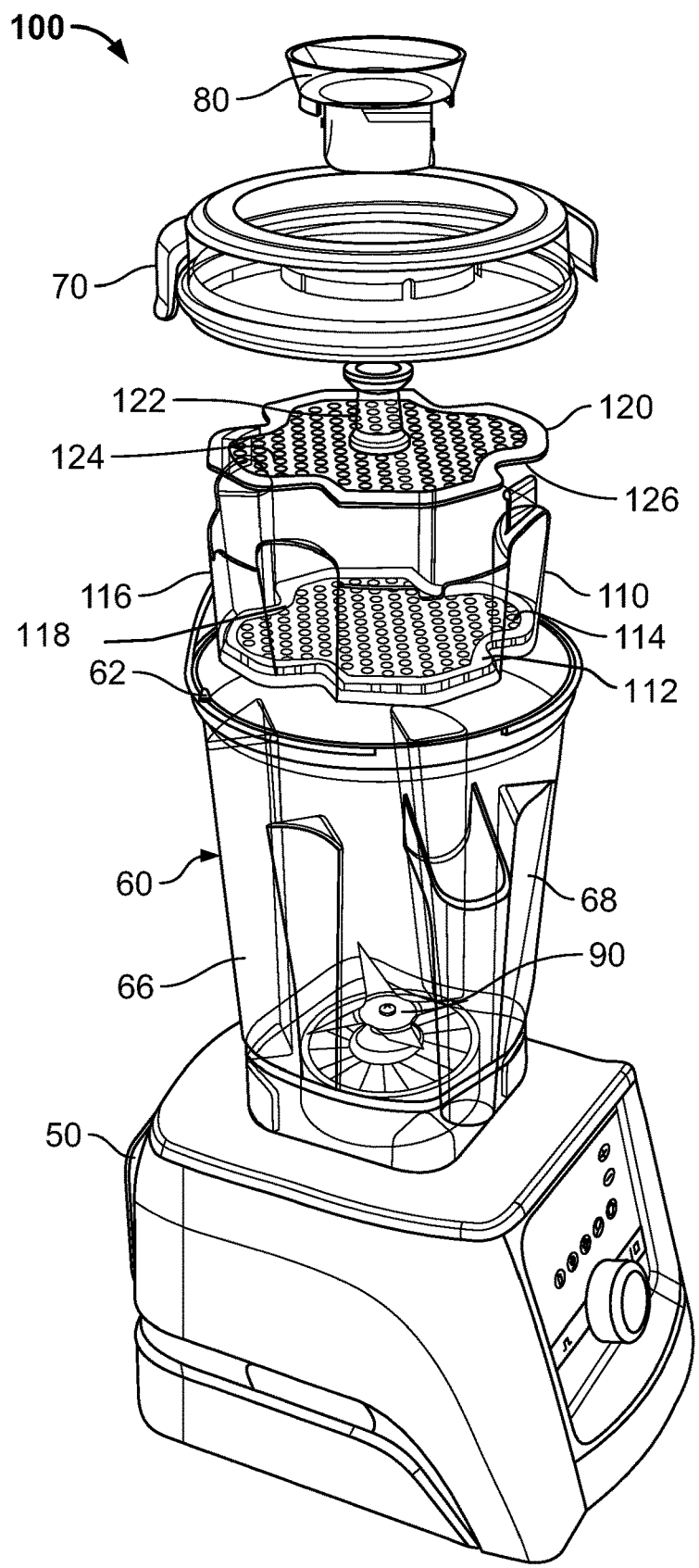
FIG. 1 is an exploded view of the blending system including a steamer basket in accordance with various disclosed aspects.

Reference will now be made in detail to embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings, e.g., features of each embodiment disclosed herein may be combined or replaced with features of the other embodiments disclosed herein. As such, the following description is presented by way of illustration only and should not limit in any way the various alternatives and modifications that may be made to the illustrated embodiments and still be within the spirit and scope of the present teachings.

It is noted that the various embodiments described herein may include other components and/or functionality. It is further noted that while described embodiments refer to a blender or a blender system, various other systems may be utilized in view of the described embodiments. For example, embodiments may be utilized in food processor systems, mixing systems, hand-held blender systems, various other food preparation systems, and the like. As such, references to a blender, blender system, and the like, are understood to include food processor systems, and other mixing systems. Such systems generally include a blender base that may include a motor, a blade assembly, and a controller. Further, such systems may include a container, a display, a memory or a processor. A blade assembly, a blending container, and a blender base may removably or irremovably attach. The blending container may be powered in any appropriate manner, such as disclosed in U.S. patent application Ser. No. 14/213,557, entitled Powered Blending Container, which is hereby incorporated by reference.

Foodstuff may be added to the blending container. Furthermore, while blending of "ingredients," "contents" or "foodstuffs" is described by various embodiments, it is noted that non-foodstuff may be mixed or blended, such as paints, epoxies, construction material (e.g., mortar, cement, etc.), and the like. Further, the blender systems may include any household blender and/or any type of commercial blender system, including those with covers that may encapsulate or partially encapsulate the blender. Commercial blender systems may include an overall blender system, such as a modular blender system that may include the blender along with other components, such as a cleaner, foodstuff storage device (including a refrigerator), an ice maker and/or dispenser, a foodstuff dispenser (a liquid or powder flavoring dispenser) or any other combination of such.

As used herein, the phrases "blending process," "blending program," and the like are used interchangeably unless context suggests otherwise or warrants a particular distinction among such terms. A blending process may comprise a series or sequence of blender settings and operations to be carried out by the blending device. In an aspect, a blending process may comprise at least one motor speed and at least one time interval for the given motor speed. For example, a blending process may comprise a series of blender motor speeds to operate the blender blade at the given speed, a series of time intervals corresponding to the given motor speeds, and other blender parameters and timing settings. The blending process may further include a ramp up speed that defines the amount of time the motor takes to reach its predetermined motor speed. The blending process may be stored on a memory and recalled by or communicated to the blending device.

A steam system is described. The steam system includes a blender base, a container received by the base, the container comprising a blade assembly, and a lid, and a basket comprising a bottom that includes at least one aperture, wherein the container operatively receives the basket such that the basket rests within the container. For instance, the basket may nest within the container. In an aspect, the container may comprise interior pillars, and the basket may rest on the interior pillars within the container such that the basket is displaced from the blades.

The basket is displaced from the blades when the basket rests on the interior pillars. The steam system may comprise a basket lid operatively attachable to the basket. The basket lid may comprise at least one aperture formed therethrough. The basket lid may comprise a chute extending away from the basket when the basket lid is operatively attached to the basket. The blender tamper may be operatively received by the chute. The steam system may comprise a gasket positioned between at least a portion of the basket lid and at least a portion of the basket. In another example, the basket further comprises basket pillars that generally mirror the shape of at least a portion of the internal pillars. The basket pillars may comprise hooks that operatively rest on the internal pillars. The steam system may comprise a gasket positioned between at least a portion of the basket and at least a portion of the container. In an example, the basket further comprises sidewalls and at least one handle extending from the side walls. According to some examples, the at least one apertures of the basket are adjustable. The basket further comprises an identification tag operatively responsive to a wireless signal.

Described is a method of steaming foodstuff with a blender system, comprising: placing foodstuff into a steam basket, adding liquid to a blender container comprising a blade assembly, inserting the steam basket inside the container such that the steam basket does not contact the blade assembly; placing the container on a blender base comprising a motor; and operating the motor to generate steam within the container, wherein the steam operatively cooks the foodstuff within the steam basket. The method may include operating the motor in a range of time between 1 minute and 11 minutes. The method may impart heat into the liquid through friction created by driving the blade assembly. The blender base may determine a blending program based on identification of the steam basket.

Also described herein is a method of making cold brew coffee, comprising: placing ground coffee into a basket; inserting the basket in a blender container comprising a blade assembly; adding water to the blender container to immerse the coffee; attaching the blender container to a blender base comprising a motor; and operating the motor to drive the blade assembly for a period of time. The period of time is generally between 10 minutes and 120 minutes. The method may further comprise securing the basket a distance from the blade assembly.

In an example, an appliance, such as a blender, may be powered by a powerful 2-4 horsepower motor that can power many applications outside of blending, mixing, cutting, shredding, spiralizing, and the like.

Disclosed embodiments include a blender system including a steamer apparatus and a steamer apparatus that is operatively engagable to the blender system. The blender system may primarily include a blender base, a container operatively attachable to the blender base, a blade assembly, and a steamer basket. The blender system may be of any appropriate configuration, including without limitation, the VITAMIX ASCENT series blender. The container receives the steamer basket. The container may include a physical stop, magnet, hook, or other component that prevents the steamer basket from contacting the blade assembly or maintains the steamer basket in a desired operative position.

The blender base includes a motor disposed within the housing. The motor selectively drives a blade assembly. The blade assembly may agitate, impart heat, or otherwise interact with contents within the container. In examples, the steamer basket holds a particular type of content that is held separate from other contents within the container, as described herein. Operation of the blender system may impart heat into the contents within the steaming basket, may infuse liquids with the contents within the steaming basket, may clean foodstuff (or non-foodstuff), and the like.

In at least one embodiment, a blending system may identify or detect a steamer basket through mechanical detection (e.g., push rods), user input, image recognition, magnetic detection (e.g., reed switches), electronic detection (e.g., inductive coils, a near field communication (NFC) component), or the like. For example, a steamer basket and/or basket lid may include an NFC tag, RFID tag, or other identifier disposed on or within the steamer basket or basket lid. That tag may be positioned on or within any portion of the basket or basket lid. For instance, the tag may be disposed within side walls, a bottom, top, or other position. In another example, the tag may operatively attached to the basket or lid via adhesives, fasteners, clips, or the like. The tag may be hermetically sealed to prevent damage during use. A blender base may include an NFC component or other wireless communication device that operatively communicates with the tag, e.g., NFC component(s), on or within the basket or basket lid. The blender base may include a controller that may select blending patterns based on identification of one or more of the steamer basket, container, container lid, blade assembly, or the like. In another aspect, the controller may detect errors, such as a steamer basket inserted into the container without the steamer basket lid and/or without the container lid appropriately positioned or without the steamer basket appropriately positioned. In another aspect, the blender base may determine whether a proper combination of steamer basket and container make and model is utilized.

Aspects of systems, apparatuses or processes described herein generally related to blending or food-processing systems include a food-processing disc comprising one or more inductive coils. In another aspect, one or more of the disc and/or lid may comprise an NFC component that may interact with an NFC component of a blender base. The NFC component of the blender base may receive information regarding the type of the disc and may utilize the blender base, and the information to determine a blending process to be utilized by the system.

In at least some embodiments, a lid may include a chute for receiving foodstuff. The chute(s) may be selectively positioned based on the type of disc utilized. The blender base may utilize an NFC component to identify the position of the chute(s). The blender base may communicate to a user (e.g., via an interface) a correct position of the chute(s). In another aspect, the blender base may prevent operation of the motor until the user correctly positions the chute(s).

Disclosed is a method of steaming, comprising: placing foodstuff into a steam basket; adding water to a blender container; putting a lid on the steam basket; inserting the steam basket inside the container until it is firmly seated on a pillar of interior of container; putting a container lid on the container; running the blender in a range of time between 1 minute and 11 minutes to create steam to cook the foodstuff in the steam basket; removing basket from inside the container, as an example; and removing food from the basket; and serve.

Disclosed is a method of making cold brew coffee, comprising: placing ground coffee into a filter basket; putting a lid on the filter basket; inserting the filter basket inside the container until it is firmly seated on a pillar of interior of container; adding water to a blender container to immerse coffee; putting a container lid on the container; running the blender in a range of time between 10 minutes and 120 minutes; removing basket from inside the container; and pouring cold brew coffee for serving, as an example.

Turning now to FIGS. 1-7, there is a blending system 100 that may steam, infiltrate, clean, or otherwise process foodstuff or objects. The blending system 100 may primarily include a blender base 50, a container 60, a lid 70, and a steamer attachment or basket insert 110 that operatively receives a basket lid 120. As described herein, the basket insert 110 may be positioned within a cavity 62 of the container 60 to steam contents, infiltrate, clean, or otherwise process contents within the container 60 away from a blade assembly 90, as described herein.

According to embodiments, the basket 110 may be made of a composite, polymer, metal, or food safe other material that can withstand steam or heat within a container 60. For instance, the basket 110 may comprise a food-grade plastic such as TRITON. It is noted that the basket lid 120 may, likewise, comprise a material that can withstand steam or heat, and the basket lid 120 may comprise the same or a different material as the basket 110. In an aspect, the basket 110 and lid 120 may be machine washable, washed within the container 60, washed by hand, or otherwise washed.

Basket 110 may primarily comprise a bottom 112 and a side 116. In some embodiments, however, the basket 110 may not comprise side 116. For instance, the basket 110 may look similar to the basket lid 120 and may utilize side 66 of the container as a side when operatively inserted within the container.

The bottom 112 may comprise one or more apertures 114 formed therethrough. The apertures may allow for steam or fluid to pass through the bottom 112. In an example, foodstuff or other objects may be placed within the basket 110. As steam passes through the apertures 114, the steam may cook the foodstuff. Moreover, the foodstuff may comprise coffee, tea, aromatics, spices, or other food that may be infiltrated to infuse liquid within the container 60. According to another example, objects to be cleaned may be placed within the basket 110. Steam or liquid may pass through the apertures 114 and clean the objects placed within the basket 110.

In at least one embodiment, the bottom 112 may be opened and/or the apertures 114 may be adjusted to allow contents within the basket 110 to be dropped or released. For instance, the bottom 112 may be hingedly secured to the side 116. A user may manually actuate or a controller (e.g., a controller of a blender base, smartphone, etc.) may actuate a release mechanism to release the bottom 112 such that foodstuff is dropped into a liquid. As an example, a user may desire to steam some vegetables while other foodstuff (e.g., broth, water, spices, other vegetables) are being blended. This may allow the user to cook vegetables within the basket 110 and prevent them from being blended. Once the blending and steaming process is complete, the user may open the bottom 112 so that the steamed vegetables are released into the blended foodstuff. The resulting soup may have a chunky finish.

Side 116 may be generally sized and shaped to fit within the cavity 62 of the container 60. In at least some embodiments, side 116 may be shaped to mirror or correspond with the internal perimeter of the side 66 of the container 60. For instance, the side 116 may be generally cylindrical, frustoconical, rectangular, ovate, an n-shaped polygonal shape (where n is a number), or irregular in shape. As shown FIGS. 1-5, the side 66 of the container 60 may comprise flutes 68, detents, corners, protrusions, or other formations. For instance, container 60 may comprise four flutes 68. The side 116 of the basket 110 may comprise formations that generally correspond or mirror the formations of the side 66. For example, the side 116 may comprise flutes 118, corners, protrusions, or other formations.

Figure 2:
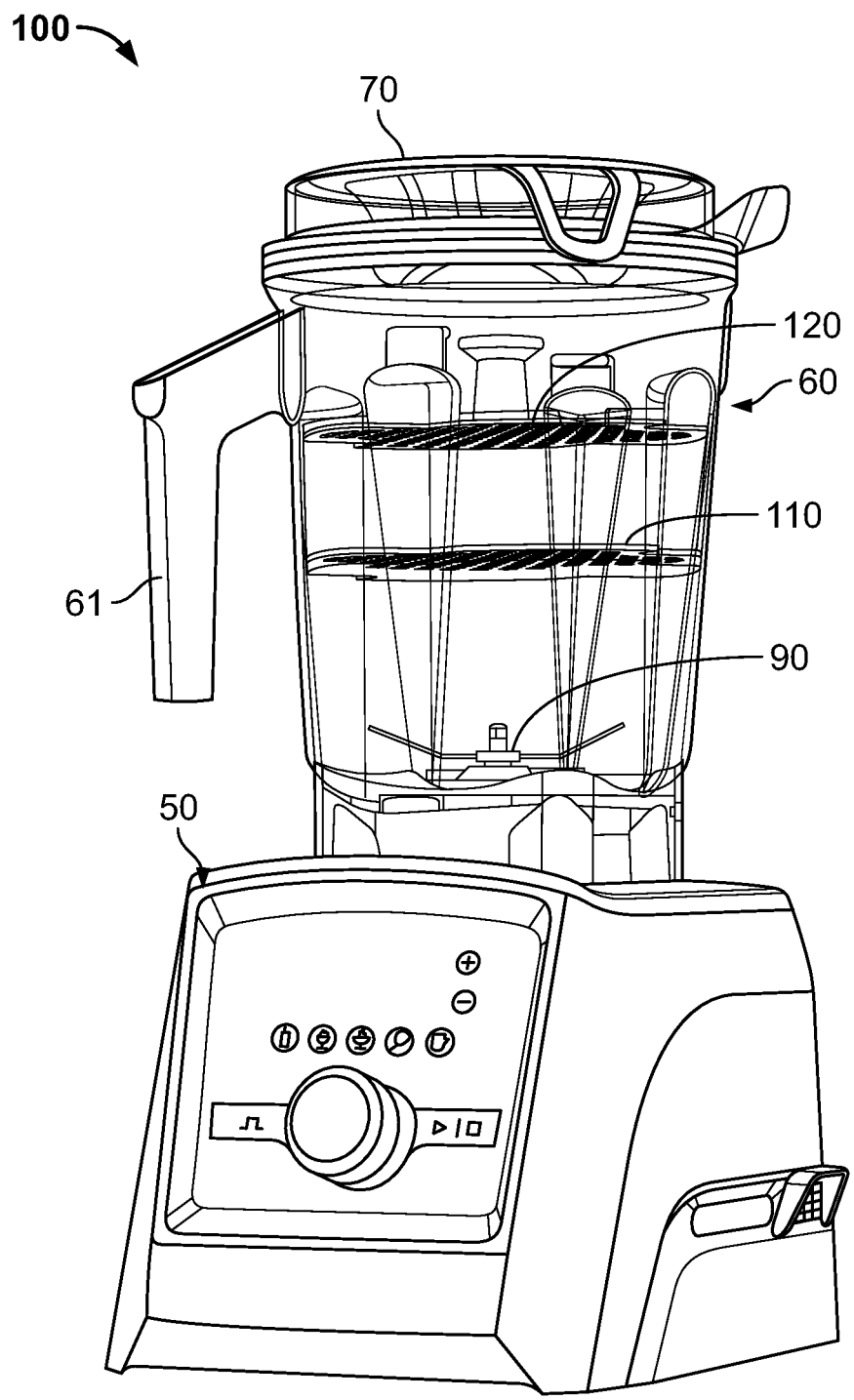
FIG. 2 is an assembled, perspective view of the blending system of FIG. 1 in accordance with various disclosed aspects.
Figure 3:
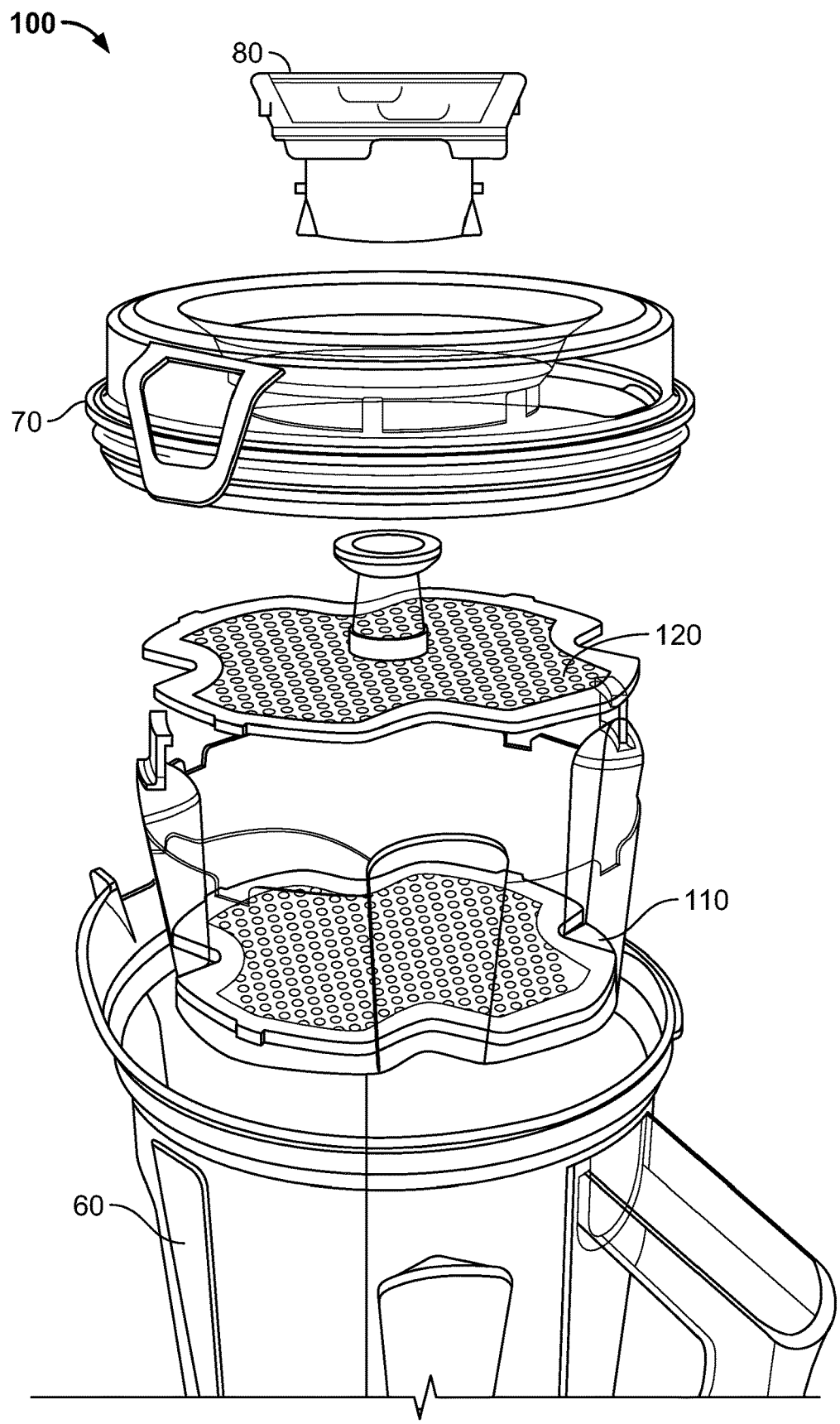
FIG. 3 is an enlarged view of a portion of the blending system of FIG. 1 including the basket in accordance with various disclosed aspects.
Figure 4:
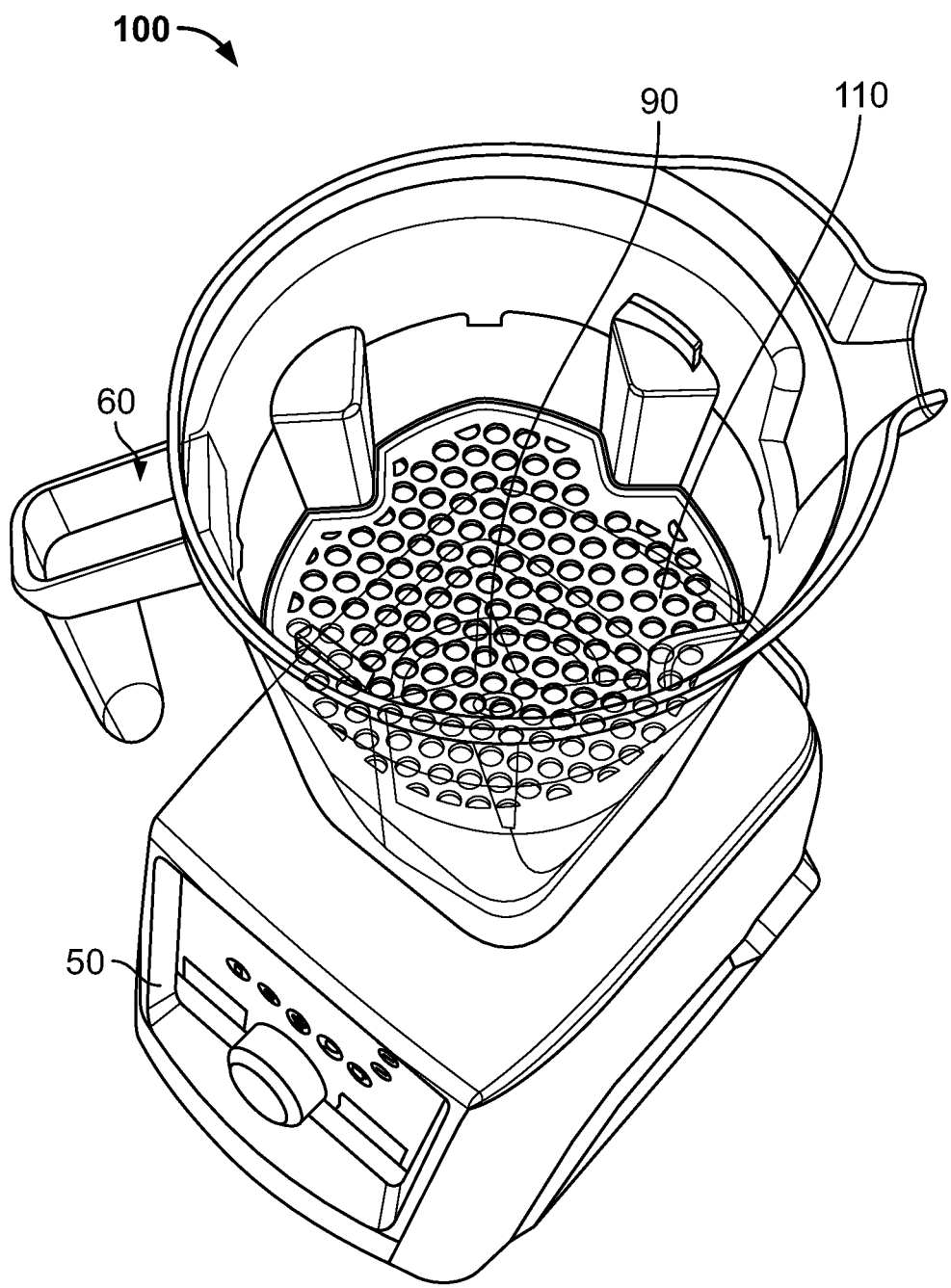
FIG. 4 is a top perspective view of the blending system of FIG. 1 in accordance with various disclosed aspects.

According to an embodiment, the basket 110 slides into (e.g., is received by) the cavity 62 of the container 60. The container 60 generally decreases in perimeter size towards the base 50. As such, the basket 110 may be physically prevented or stopped from being inserted within the cavity 62 past a given depth. The physical stop may position the basket 110 such that the bottom 112 is a distance from a blade assembly 90 of the container 60, such as shown in FIGS. 2 and 5.

It is noted that basket 110 may be held or suspended in place by various mechanisms. For instance, basket 110 may be additionally or alternatively supported by one or more hooks, fasteners, magnets, or other mechanisms that are secured to top edges of the side 66, a handle 61, or a lid 70 of the container 60. In another example, the basket 110 may be additionally or alternatively supported by legs extending from the bottom 112 that may be supported by the container 60 bottom or by ledges extending from the side 66.

Figure 5:
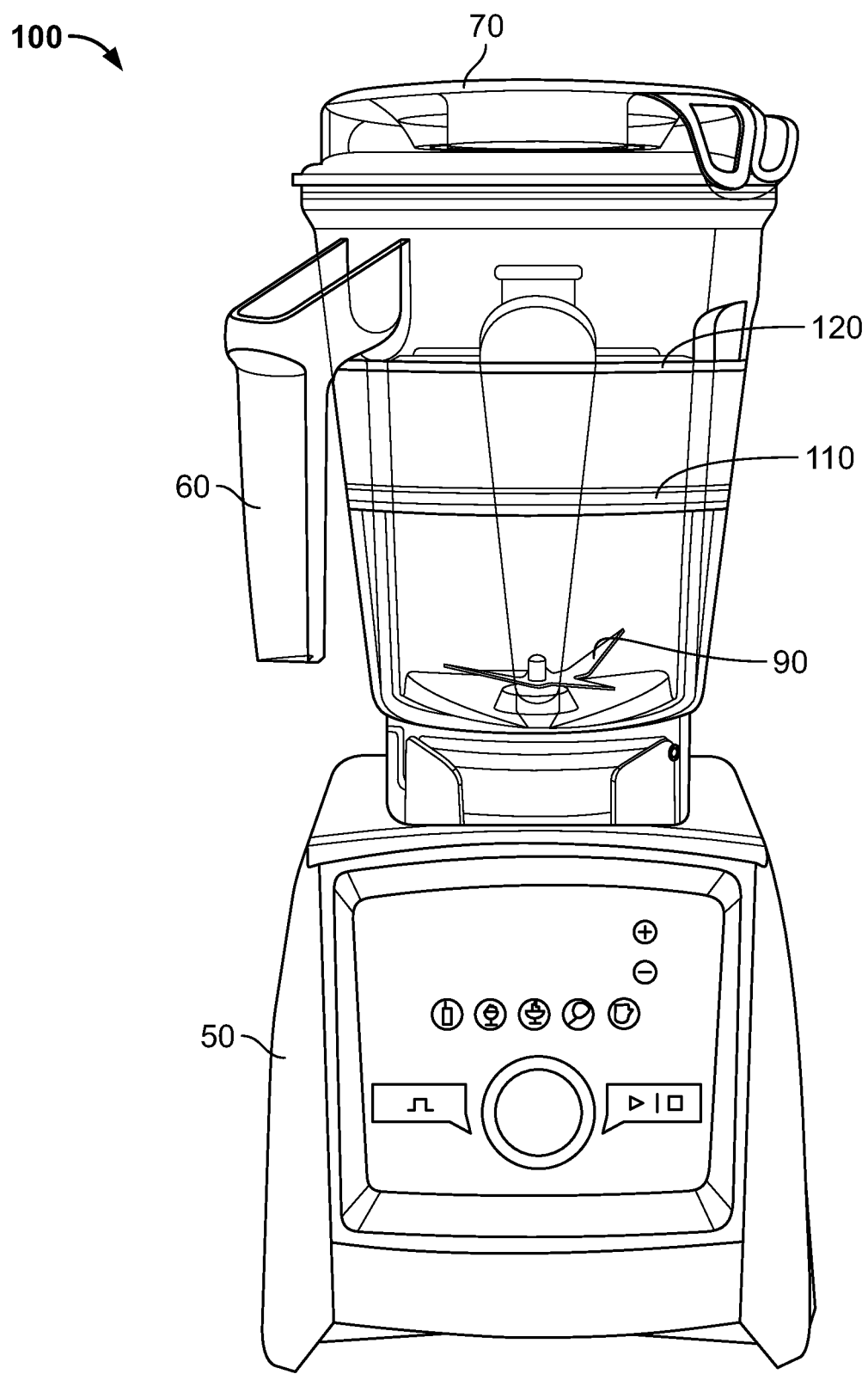
FIG. 5 is a front view of the blending system of FIG. 1 in accordance with various disclosed aspects.
Figure 6:
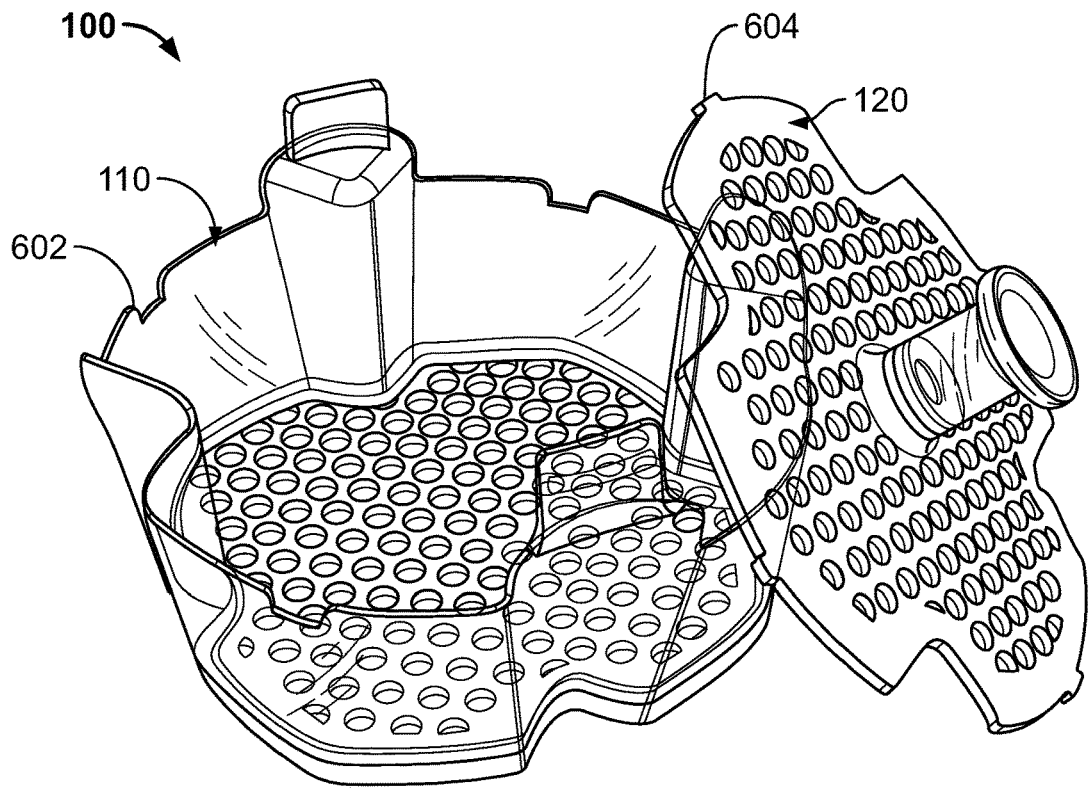
FIG. 6 is a perspective view of a steamer basket and basket lid in accordance with various disclosed aspects.
Figure 7:
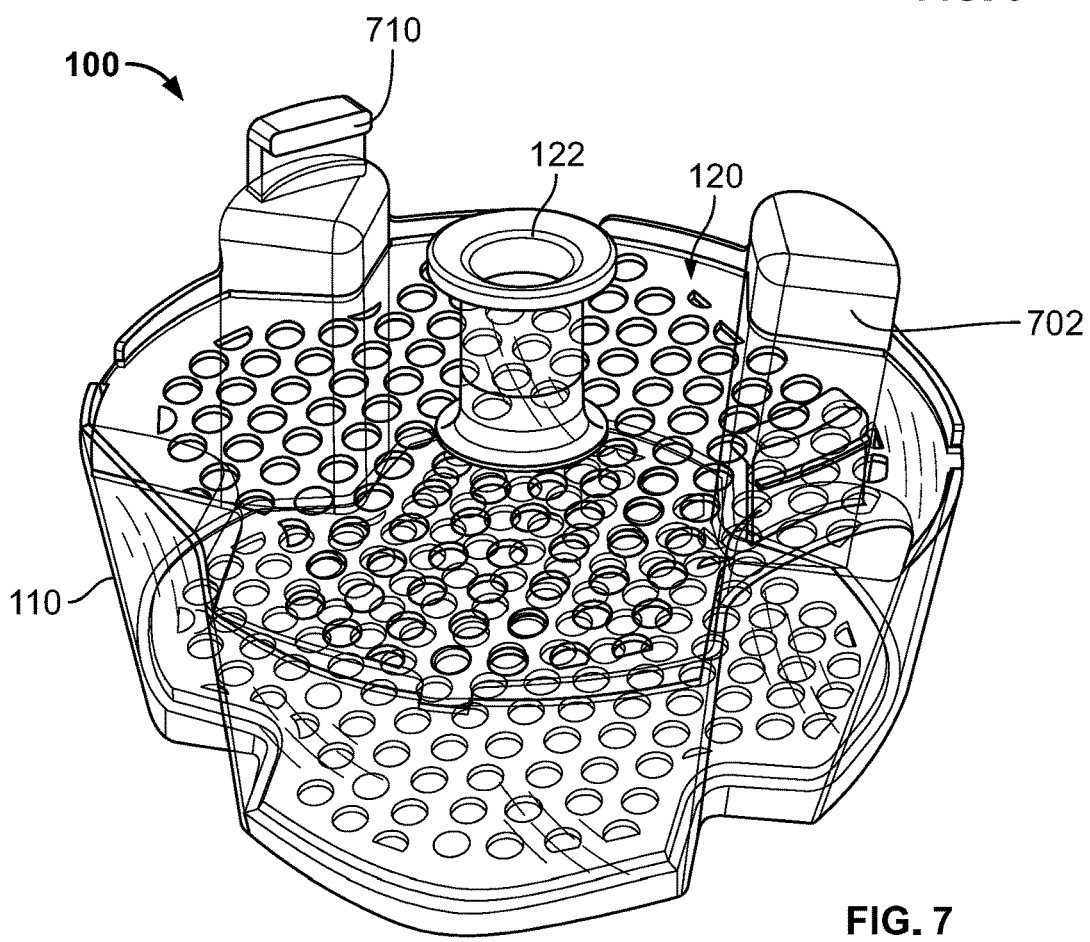
FIG. 7 is an assembled, perspective view of a steamer basket and basket lid in accordance with various disclosed aspects.
Figure 8:
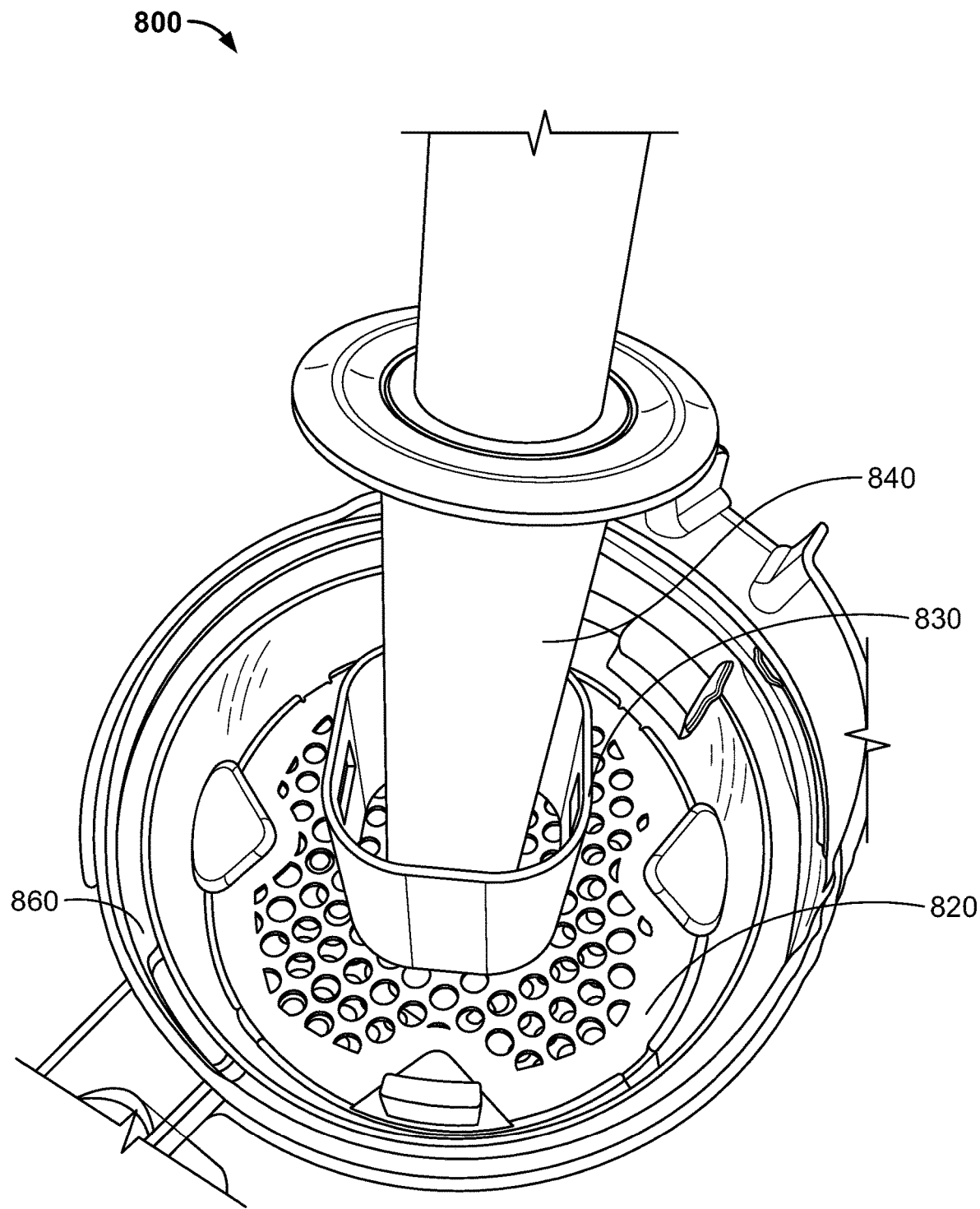
FIG. 8 is a top perspective view of a blending system including a steamer basket and a tamper in accordance with various disclosed aspects.
Figure 9:
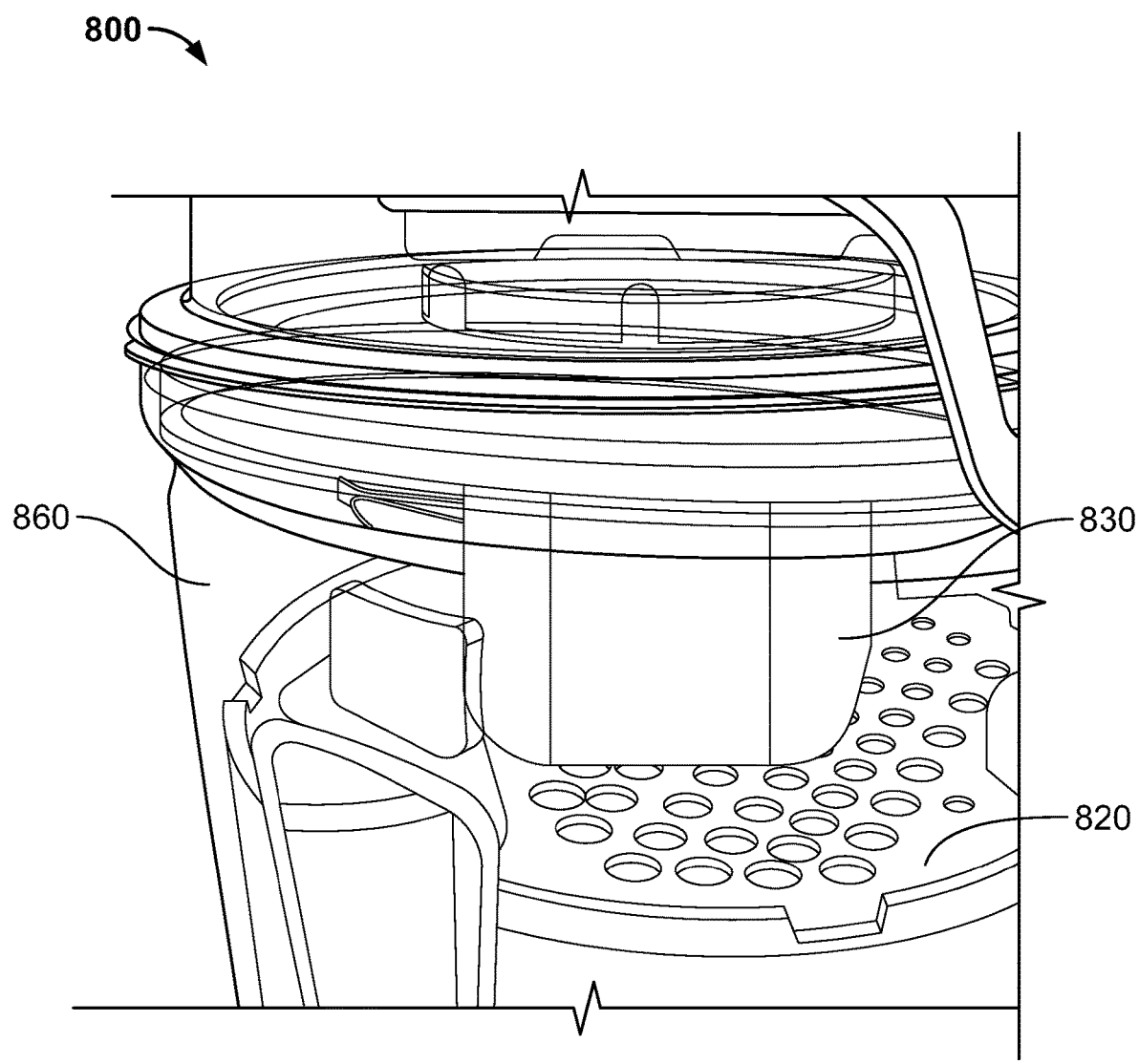
FIG. 9 is a detailed view of the blending system of FIG. 8 including the steamer basket and a blending container in accordance with various disclosed aspects.

According to at least one embodiment, as best shown in FIGS. 5-7, the side 116 may include hooks 702. The hooks 702 may comprise the terminal ends of flutes 118. The hooks 702 may grasp or otherwise abut terminal ends of the container flutes 68. The container flutes 68 may serve as suspension ledges to hold the basket 110 in place. It is noted that the basket 110 may comprise one or more hooks 702, such as one, two, three, four, or more hooks 702. In an aspect, the basket 110 may comprise two hooks 702 that are generally opposed to each other.

The basket 110 may include one or more handles 710. The handles 710 may comprise tabs, protrusions, looped handles, indented handles (e.g., such as indents to be grasped by tongs or other utensils), or other grasping surfaces. As shown, the basket 110 may include two handles 710 in the form of opposed tabs extending from the basket 110 in a direction opposite the blender base 50. In another aspect, the tabs may be formed such that there is space between the tabs and the container side 66 to allow for a user's hand or fingers. Moreover, the tabs may be spaced so as to allow enough room for a user's hands and a hot pad or other object to pass between the tabs and the side 66. In some embodiments, however, the basket 110 may comprise material that is not prone to heat such that when a user lifts the basket 110 after a steaming process, the user will not experience any discomfort from a hot element. It is noted, however, that steam or other material may be displaced onto the basket 110. Accordingly, a user may wait for the material to cool, wipe the material off, use a utensil or use a hot pad to remove the basket 110. The handles 710 may be formed of a material that does not conduct heat, such as a food-grade plastic (e.g., TRITON), for example.

The basket 110 may include or receive a removably attachable basket lid 120. The basket lid 120 may include one or more apertures 124 formed therethrough. The apertures 124 may allow for venting. It is noted that some embodiments may include a basket lid 120 that is unvented or otherwise free of apertures 124. Moreover, embodiments may include interchangeable lids 120 that may be vented or unvented, and selected based on a desired effect on the foodstuff or other objects within the within the basket 110.

Basket lid 120 may include a handle 122 that provides a grasping surface for a user's hands, utensils, or the like. When assembled with the basket 110 and operatively inserted within the container 60, the handle 122 may allow a container lid 70 to be attached to the container 60 without contacting the container lid 70. In some embodiments, however, the handle 122 may comprise material that is not prone to heat such that when a user lifts the handle 122 after a steaming process, the user will not experience any discomfort from a hot element. It is noted, however, that steam or other material may be displaced onto the handle 122. Accordingly, a user may wait for the material to cool, wipe the material off, use a utensil or use a hot pad to remove the handle 122. In other embodiments, the handle 122 may be operatively attached to the container lid 70, such that the user may remove the container lid 70 to remove the lid 120.

It is further noted that the basket lid 120 may be sized and shaped to be received by the basket 110. In one example, the basket lid 120 is attachable to the basket 110 such that the basket lid 120 does not contact the container 60. This may prevent or reduce transfer of vibrations directly between the basket lid 120 and the container 60. As best shown in FIGS. 6-7, the side 116 of the basket 110 may include one or more grooves 602 that may operatively receive one or more tabs 604 extending from the basket lid 120. It is noted that the basket lid 120 may be attached to the basket 110 via other mechanisms, such as via a friction fit, fasteners, threaded connections, bayonet-type connections, magnets, or the like.

Additionally or alternatively, the present disclosure contemplates that basket 110 and/or basket lid 120 may comprise adjustable apertures 114 and 124, respectively. For instance, a cover may be selectively positioned to adjust the sizes of positioning of the apertures 114 or apertures 124. In some embodiments, the cover may be rotatable, removable, or otherwise selectively positionable. A user may adjust the apertures 114 or apertures 124 based on a desired level or amount of steam or hot liquid that will be allowed to pass therethrough. In some embodiments, the blender base 50 may determine an appropriate adjustment for the apertures 114 or 124 based on a selected blending pattern and may display the adjustment to the user view an interface.

Embodiments may include gaskets or dampening members disposed between the basket 110 and the container 60. In an example, an elastomeric gasket or sleeve may be positioned around the basket 110 (e.g., around the side 116). Insertion of the gasket and basket 110 may generally prevent transfer of vibrations between the basket 110 and the container 60. In another aspect, the gasket may provide or form a seal between the basket 110 and the container 60 so that steam is directed into the basket. It is noted that the gasket may be attached directly to the container 60 or the basket 110. In another example, the gasket may be removably attached to the container 60 or basket 110, such as through magnets, friction fit, fasteners, or other mechanisms. Moreover, the gasket may be a monolithic gasket or may comprise a plurality of disparately formed gaskets.

Some embodiments may include gaskets disposed between the basket lid 120 and one or more of the basket 110 or the container 60. For example, an elastomeric gasket may be positioned between the basket lid 120 and the basket 110 to prevent or reduce transfer of vibrations there between. The reduced vibrations may reduce the amount of noise generated during a blending process.

Turning now to FIGS. 8-17, there depicted is a blending system 800 including a steamer basket in accordance with various disclosed aspects. The blending system 800 may primarily comprise a basket 810, a basket lid 820, a container 860, and a container lid 870. It is noted that like named parts of systems 100 and 800 may comprise similar aspects. For instance, basket 810 may comprise similar aspects as basket 110. As described herein, the basket lid 820 is operatively attachable to the basket 810. The basket 810 may be inserted into the container 860. The container lid 870 may be operatively attached to the container 860. In at least one embodiment, the container lid 870 may include a plug or cap

Figure 10:
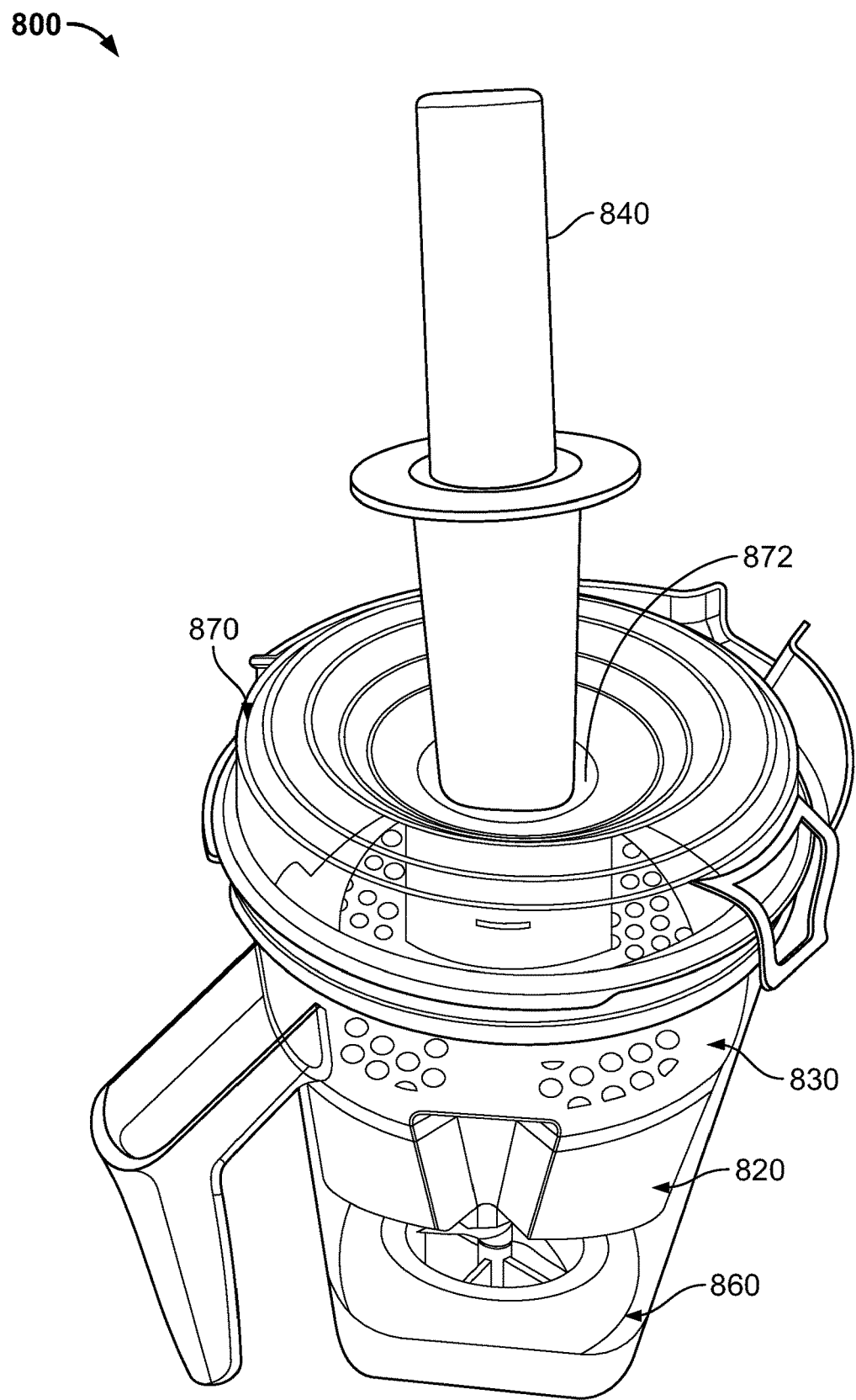
FIG. 10 is a detailed, side view of the blending system of FIG. 8 including the steamer basket assembled with a container and a container lid, and interacting with the tamper in accordance with various disclosed aspects.
Figure 11:
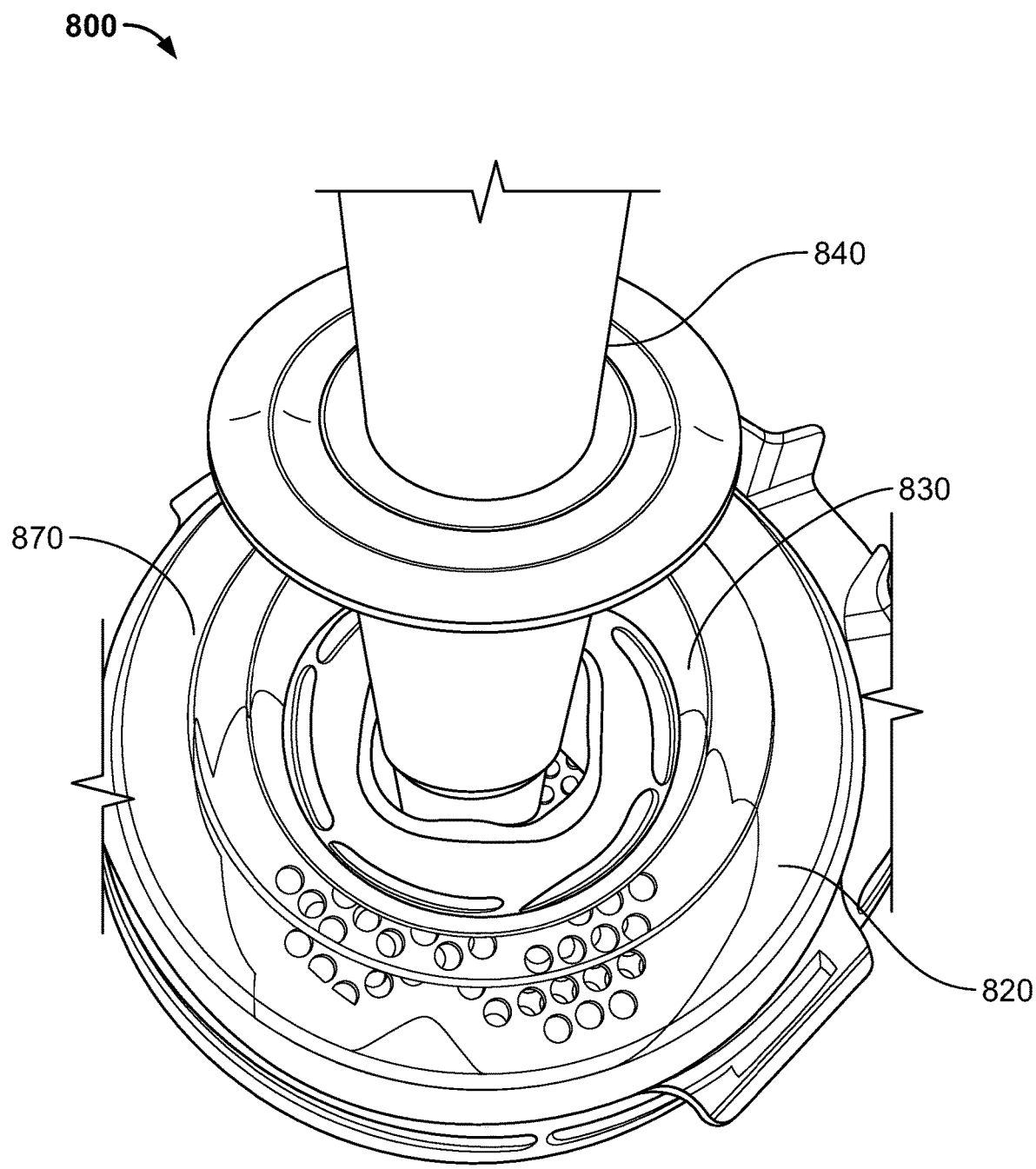
FIG. 11 is a detailed, top perspective view of the blending system of FIG. 8 including the steamer basket assembled with the container and the container lid, and interacting with the tamper in accordance with various disclosed aspects.
Figure 12:
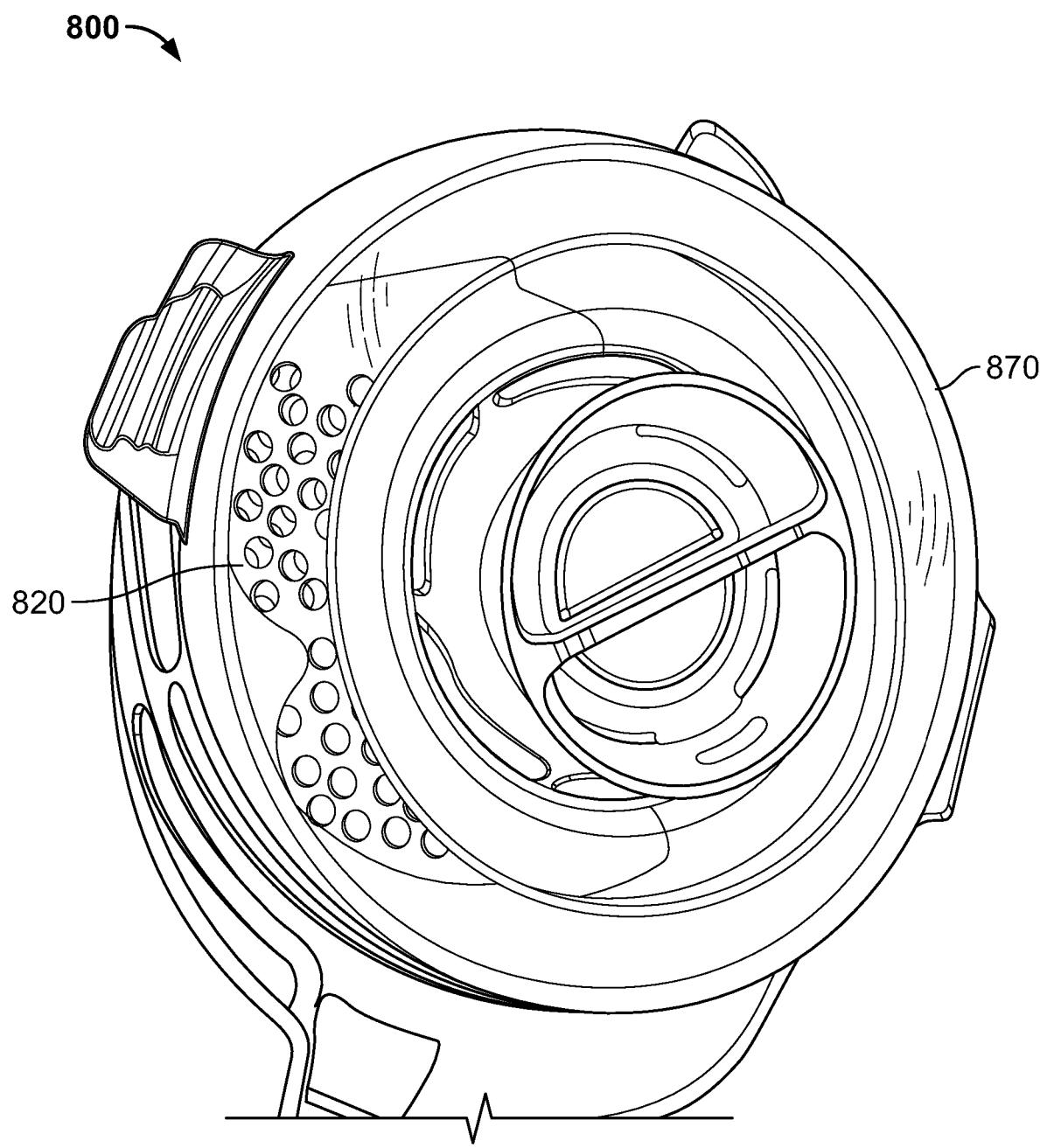
FIG. 12 is a detailed, top perspective view of the blending system of FIG. 8 including the container lid without a cap in accordance with various disclosed aspects.
Figure 13:
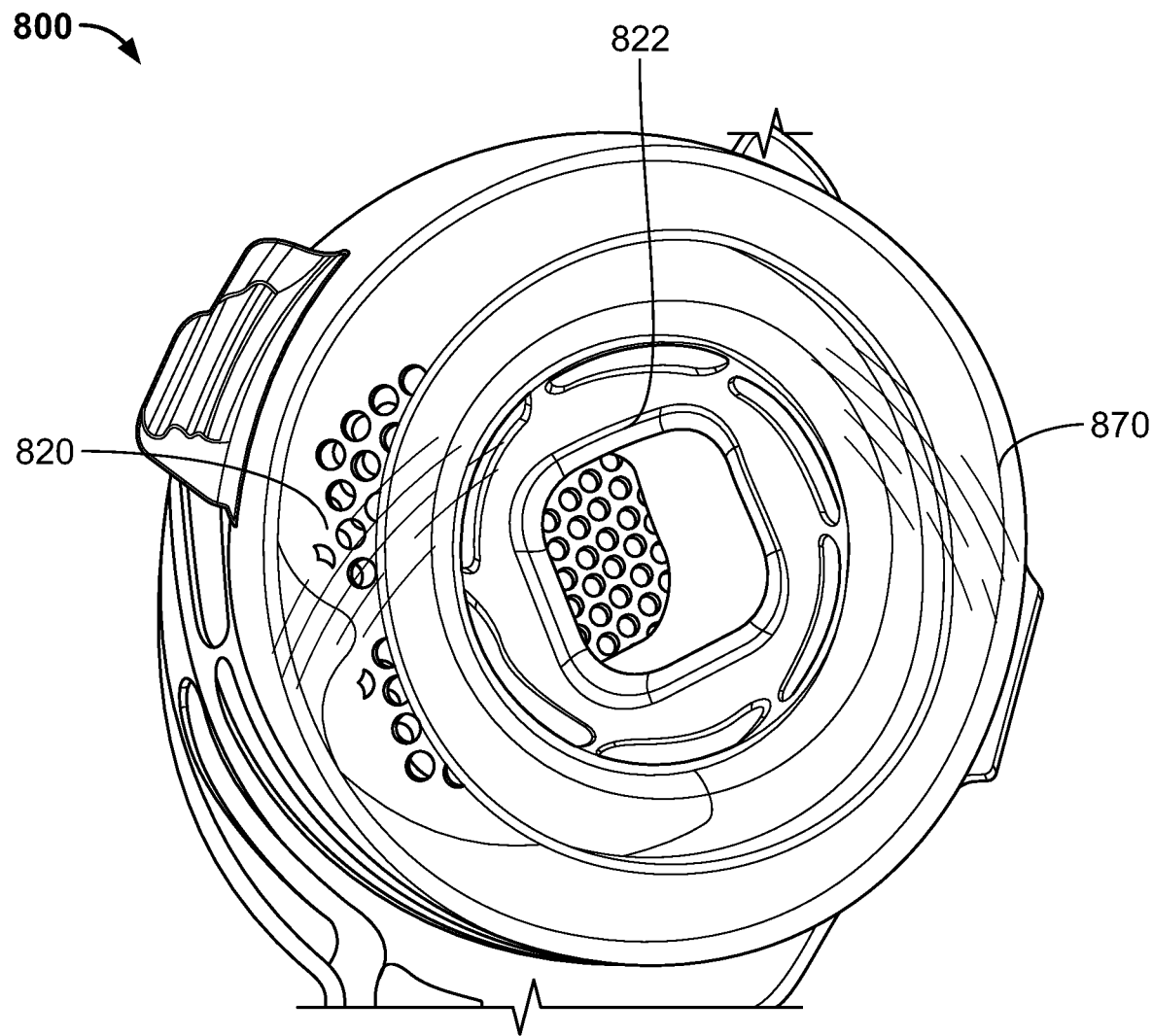
FIG. 13 is a detailed, top perspective view of the blending system of FIG. 8 including the container lid with a cap in accordance with various disclosed aspects.
Figure 14:
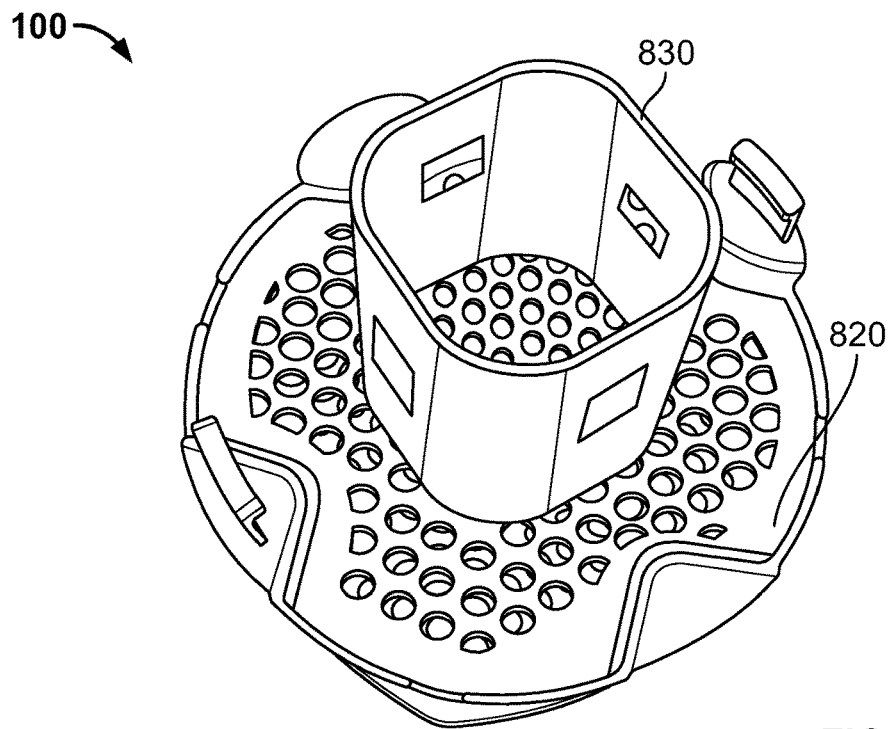
FIG. 14 is a top perspective view of the steamer basket of the blending system of FIG. 8 in accordance with various disclosed aspects.
Figure 15:
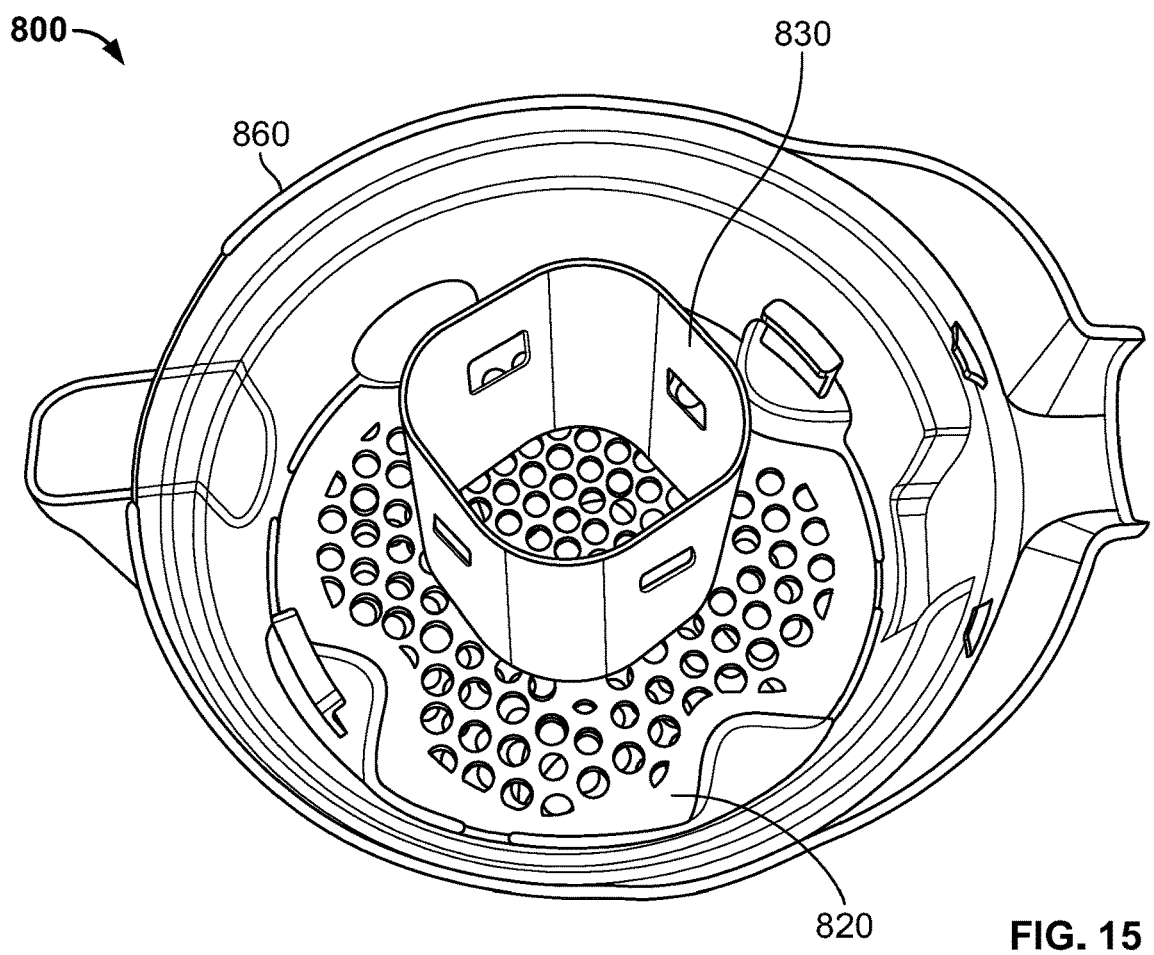
FIG. 15 is a top perspective view of the steamer basket and the container of the blending system of FIG. 8 in accordance with various disclosed aspects.
Figure 16:
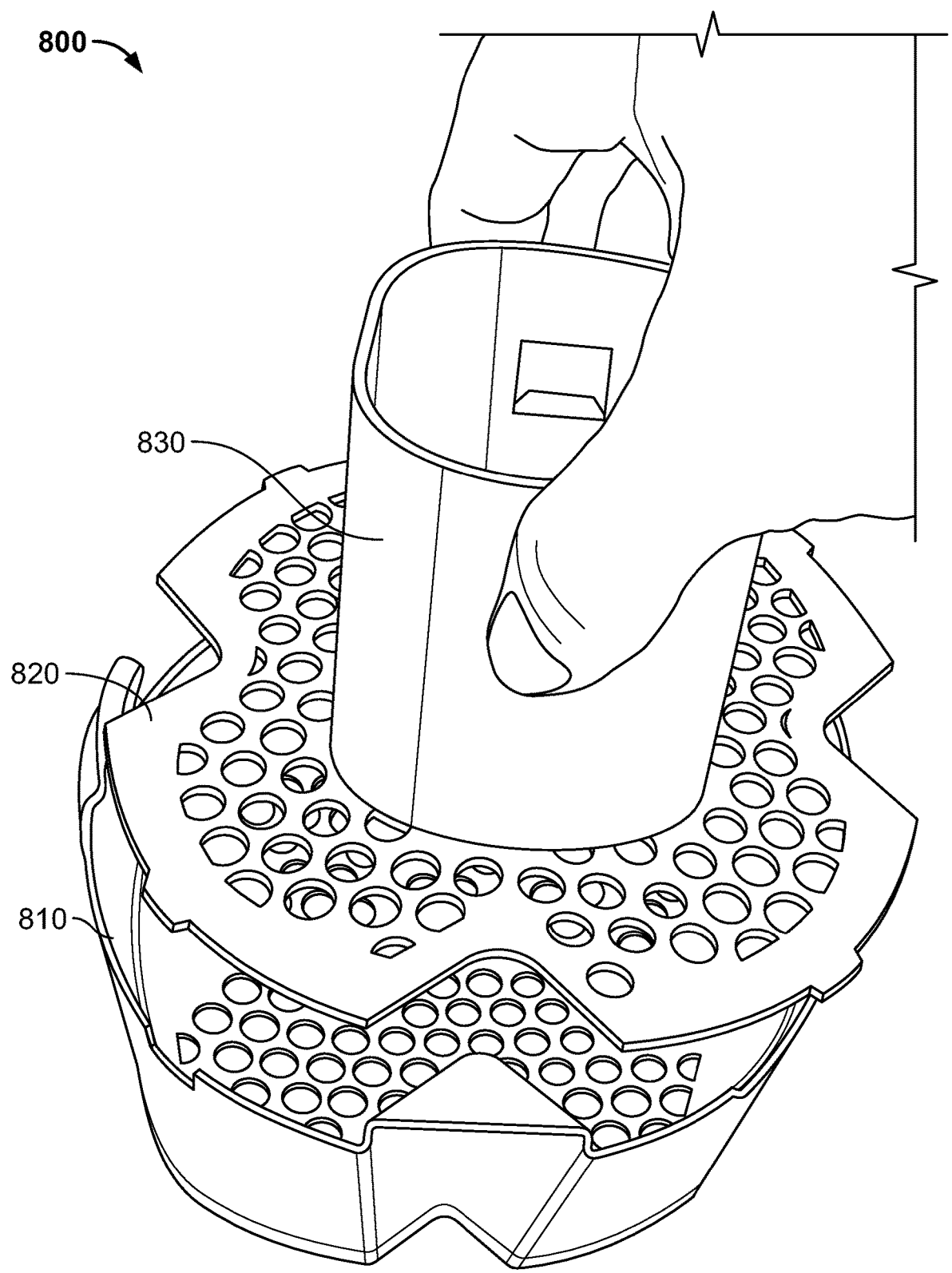
FIG. 16 is a top perspective view of the steamer basket and a basket lid of the blending system of FIG. 8 in accordance with various disclosed aspects.
Figure 17:
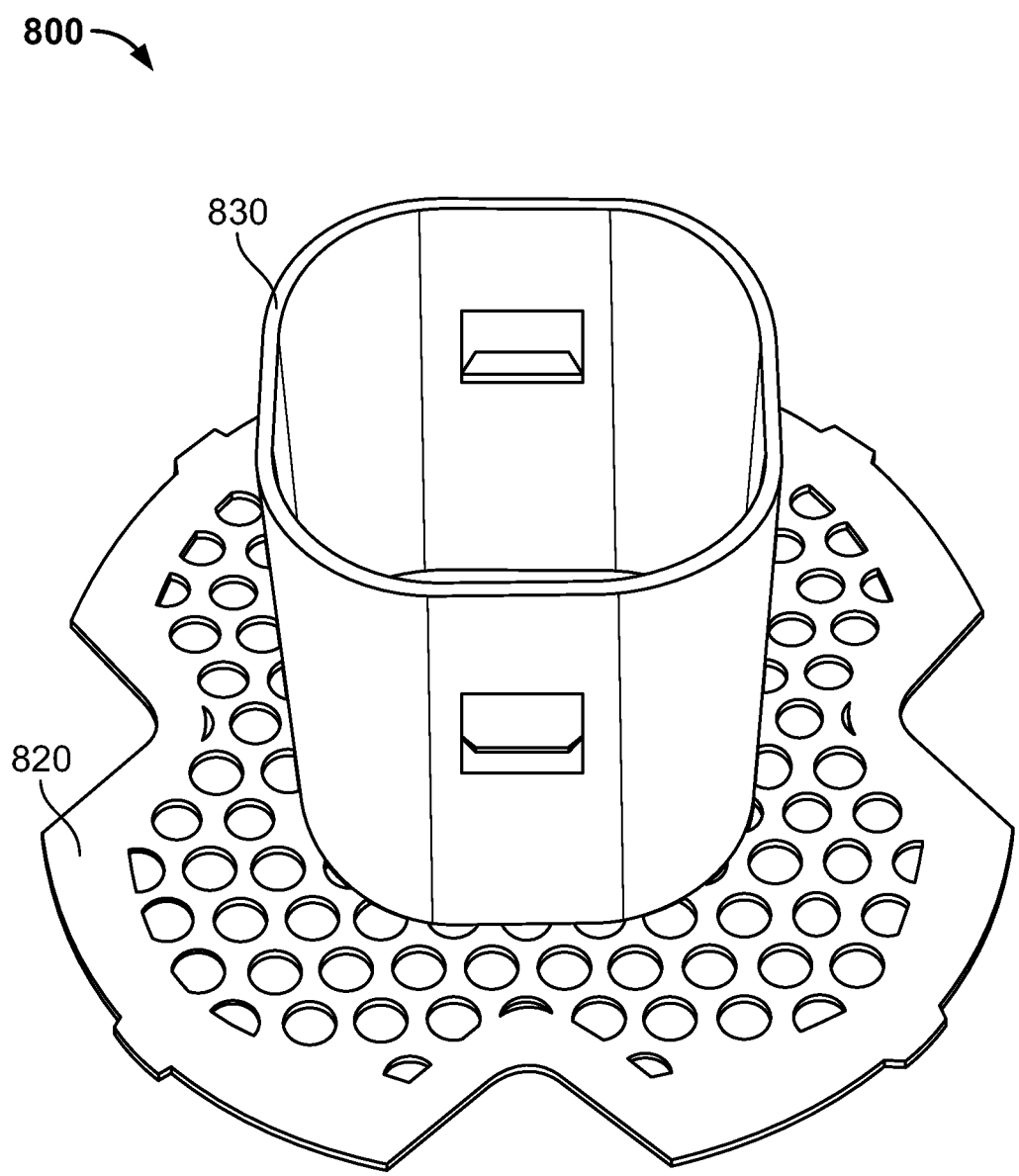
FIG. 17 is a front, elevated perspective view of the steamer basket and the blending system of FIG. 8 in accordance with various disclosed aspects.

880. The cap 880 may be removably attached to the container lid 870. Removal of the cap 880 allows a user to access an aperture 882 formed through the lid 870. The user may add ingredients to the container 860 without removing the lid 870. In another aspect, the user may utilize a tamper 840 to handle foodstuff or other objects during a blending process. Tamper 840 may comprise some or all aspects described in U.S. Des. Pat. No. D,666,056, the entirety of which which incorporated herein by reference. The container lid 870 and cap 880 are in mechanical communication to allow for the basket lid 820 and container lid 870 to be controlled, so that either more ingredients or foodstuff may be added, or the use of a tamper 840 may be used in certain applications, such as handling foodstuff in the basket, as shown in FIGS. 10-12.

It is noted that tamper 840 may access the basket 810 through a lid aperture "smokestack-like" chute 830 protruding from a basket lid 820. The chute 830 aligns with the cap 880 of the basket lid 820 and may help secure the basket lid 820 during usage or operation of the appliance. The chute 830 may be substantially cylindrical or rectangular in shape, and is preferably uniform in diameter, but the present disclosure contemplates a chute 830 with either an increasing or decreasing cross sectional diameter while keeping within the spirit and scope of the present disclosure.

In view of the subject matter described herein, methods that may be related to various embodiments are described below. While such methods may be described as a series of actions or steps, it is noted that associated methods or processes are not limited by the order of the actions or steps. It is further noted that some actions or steps may occur in different orders or concurrently with other actions or steps. Moreover, different actions or steps may be utilized to implement the methods described hereinafter. Various actions or steps may be completed by one or more of users, mechanical machines, automated assembly machines (e.g., including one or more processors or computing devices), or the like. The various methods may be accomplished through use of or by the any of the disclosed embodiments. As such, reference to system 100 or system 800 are made for simplicity of explanation. It is noted that the described blending systems may be used to steam objects, clean objects, strain objects (e.g., as a colander), or the like.

In one aspect, a user may utilize the basket 110 as a strainer or colander to wash foodstuff and drain excess water. The user may use the basket 110 independently of blending or may filter blended content with the basket 110.

Described methods may provide for steaming foodstuff in the basket 110 during blending. In an embodiment of the present disclosure, a method for steaming food stuff is contemplated with the following steps:

1) Put food in the basket 110
2) Add warm water to the container 60
3) Put the basket lid 120 on the basket 110 and insert the basket 110 inside the container 60 until it is firmly seated on the pillar of interior of container 60.
4) Put container lid 70 on the container 60.
5) Select a blending program, such as soup mode, on the blender or through a device operatively and communicatively coupled to the blender, such as a smartphone, tablet computer, laptop computer, computer, point-of-sale system, wearable device, or the like.
6) Run the blending program, or alternatively run the blender for 6 minutes, ramping up slowly to full speed. The blender will create steam and hot water to cook/steam the foodstuff in the basket 110.
7) Remove basket 110 from inside the container 60 and remove food from the basket 110 and serve.

The present disclosure contemplates a system and method for usage as an infuser. For example, instead of water, a broth or other aromatic, flavored, or seasoned liquid may be placed in the blender container 60 to infuse foodstuff in the basket 110 during the steaming-like process.

Additionally, the present disclosure contemplates a system and method for completely immersing the basket 110, which may have holes or be made of a filter-like material, to completely or partially immerse the foodstuff in the basket in an aromatic, flavored, or seasoned liquid to interact with foodstuff inside the basket to either make the liquid (e.g., water, broth, etc.) infused with foodstuff in the basket, or infusing the liquid into the foodstuff in the basket.

The present disclosure also contemplates a plurality of different blade assemblies 90, disks, or attachments that can disrupt the water or liquid in a container 60 during the steaming or infusing process.

For example, a whipping disk, as described in W.O. Pat. Pub. No. 2016205345 A1, which is incorporated by reference in its entirety herein.

The whipping disk creates a less violent vortex of liquid in a container 60, and may be used for more delicate foodstuff items. Moreover, the whipping disk does not generate as much friction that may result in heating of the liquid.

A more violent blade or attachment may be utilized for certain applications where it is desired to have a more aggressive movement of liquid with the foodstuff in the basket. Moreover, the more aggressive movement of liquid may be desired to heat the liquid for either the steaming process, where the foodstuff is NOT immersed in the liquid; or a cooking process, where the foodstuff MAY be immersed completely or partially in the liquid.

The present disclosure also contemplates a system where the basket may be a predominantly mesh or filter-like material such that steeping of teas or coffees is possible. Additionally, the basket may have a frame or support structure that can receive and support mesh or filter-like materials to form the basket.

For example, the present disclosure contemplates a method for making higher intensity coffee or cold brew coffee, where the basket is more filter-like. Coffee is added to the filter basket and then water is added to a level covering the coffee in the filter basket. Then the blender is activated to create a vortex movement of water through the filter. Depending on the desired results, a more delicate whipping disk can be used such that the liquid in the container may not heat up for cold brewing or a more aggressive blade may be used in other applications where heating of the liquid may be desired.

It should be noted that teas and other drinks may be created in similar fashion.

The present disclosure also contemplates a method for cleaning food stuff, where food stuff is added to the basket, and the container 60 is filled up to the basket 110, such that when the motor is activated, the blending motion of the water inside the container 60 will wash the foodstuff—either at a high or low level of intensity which is dependent on the blade or disk used, and the speed of the appliance, preferably a blender.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define embodiments disclosed herein. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A steam system, comprising:
   a blender base;
   a container received by the base, the container comprising a blade assembly and a lid, wherein the blade assembly is configured to impart heat to generate steam;
   a basket comprising a bottom that includes at least one aperture, wherein the container operatively receives the basket such that the basket rests within the container;
   a basket lid operatively attachable to the basket; and
   a gasket positioned between at least a portion of the basket lid and at least a portion of the basket.

2. The steam system of claim 1, wherein the container further comprises interior pillars, and wherein the basket rests on the interior pillars within the container such that the basket is displaced from the blades.

3. The steam system of claim 1, further comprising a basket lid operatively attachable to the basket.

4. The steam system of claim 3, wherein the basket lid comprises at least one aperture formed therethrough.

5. The steam system of claim 3, wherein the basket lid comprises a chute extending away from the basket when the basket lid is operatively attached to the basket.

6. The steam system of claim 5, further comprising a blender tamper operatively received by the chute.

7. The steam system of claim 1, wherein the basket further comprises basket pillars that generally mirror the shape of at least a portion of the internal pillars.

8. The steam system of claim 1, further comprising a gasket positioned between at least a portion of the basket and at least a portion of the container.

9. The steam system of claim 8, wherein the basket pillars comprise hooks that operatively rest on the internal pillars.

10. The steam system of claim 1, wherein the basket further comprises sidewalls and at least one handle extending from the side walls.

11. The steam system of claim 1, wherein the at least one apertures are adjustable.

12. The steam system of claim 1, wherein the basket further comprises an identification tag operatively responsive to a wireless signal.

13. The steam system of claim 1, wherein at least a portion of the bottom of the basket comprises a hinged door.

14. A steam system, comprising:
    a blender base;
    a container received by the base, the container comprising a blade assembly and a lid;
    a basket comprising a bottom that includes at least one aperture, wherein the container operatively receives the basket such that the basket rests within the container, wherein at least a portion of the bottom of the basket comprises a hinged door; and
    a gasket positioned between at least a portion of the basket and at least a portion of the container.

15. A steam system, comprising:
    a blender base;
    a container received by the base, the container comprising a blade assembly and a lid;
    a basket comprising a bottom that includes at least one aperture, wherein the container operatively receives the basket such that the basket rests within the container; and
    a basket lid operatively attachable to the basket, wherein the basket lid comprises a chute extending away from the basket when the basket lid is operatively attached to the basket.

* * * * *